US008990579B2

(12) United States Patent
Kim

(10) Patent No.: US 8,990,579 B2
(45) Date of Patent: *Mar. 24, 2015

(54) MOBILE COMMUNICATION TERMINAL HAVING PASSWORD NOTIFY FUNCTION AND METHOD FOR NOTIFYING PASSWORD IN MOBILE COMMUNICATION TERMINAL

(71) Applicant: Samsung Electronics Co., Ltd., Gyeonggi-do (KR)

(72) Inventor: Kyong-Su Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/300,958

(22) Filed: Jun. 10, 2014

(65) Prior Publication Data

US 2014/0295799 A1   Oct. 2, 2014

Related U.S. Application Data

(63) Continuation of application No. 14/064,882, filed on Oct. 28, 2013, now Pat. No. 8,793,501, which is a continuation of application No. 11/838,527, filed on Aug. 14, 2007, now Pat. No. 8,572,393.

(30) Foreign Application Priority Data

Sep. 21, 2006 (KR) ........................ 10-2006-0091955

(51) Int. Cl.
| | |
|---|---|
| G06F 21/00 | (2013.01) |
| H04W 12/06 | (2009.01) |
| H04L 29/06 | (2006.01) |
| H04M 1/66 | (2006.01) |
| H04M 1/725 | (2006.01) |

(52) U.S. Cl.
CPC ............ *H04W 12/06* (2013.01); *H04L 63/083* (2013.01); *H04M 1/66* (2013.01); *H04M 1/72519* (2013.01)
USPC .......................................... 713/183; 713/184

(58) Field of Classification Search
CPC ............................ H04L 63/083; H04W 12/06
USPC .................................................. 713/183, 184
See application file for complete search history.

(56) References Cited

U.S. PATENT DOCUMENTS

| | | | |
|---|---|---|---|
| 8,024,577 B2 | 9/2011 | Ohmori et al. | |
| 8,078,881 B1 | 12/2011 | Liu | |

(Continued)

FOREIGN PATENT DOCUMENTS

KR   1020060129632   12/2006

*Primary Examiner* — Kambiz Zand
*Assistant Examiner* — Benjamin Kaplan
(74) *Attorney, Agent, or Firm* — The Farrell Law Firm, P.C.

(57) ABSTRACT

A method and an apparatus are provided for unlocking an electronic device. A first input screen portion for unlocking the electronic device from a locking mode is displayed. A first input is received from a user via the first input screen portion. The first input is compared with a first user-defined information stored in the electronic device. A second input is received from the user via a second input screen portion. The second input screen portion is displayed after a determination that the first input does not match from the first user-defined information. The second input is compared with a second user-defined information stored in the electronic device. In response to the second input matches to the second user-defined information, the electronic device is unlocked from the locking mode.

24 Claims, 7 Drawing Sheets

(56) References Cited

U.S. PATENT DOCUMENTS

| | | |
|---|---|---|
| 2001/0047347 A1 | 11/2001 | Perell et al. |
| 2003/0208683 A1 | 11/2003 | Johnson |
| 2004/0133812 A1 | 7/2004 | Ohmori et al. |
| 2005/0038689 A1 | 2/2005 | Shahoumian |
| 2005/0097320 A1 | 5/2005 | Golan et al. |
| 2005/0273442 A1 | 12/2005 | Bennett et al. |
| 2006/0037073 A1 | 2/2006 | Juels et al. |
| 2006/0173917 A1 | 8/2006 | Kalmick et al. |
| 2007/0044023 A1 | 2/2007 | Carter et al. |
| 2007/0050638 A1 | 3/2007 | Rasti |
| 2008/0062133 A1 | 3/2008 | Wolf |
| 2009/0055642 A1 | 2/2009 | Myers et al. |
| 2009/0163140 A1 | 6/2009 | Packham et al. |
| 2009/0234862 A9 | 9/2009 | Begeja et al. |

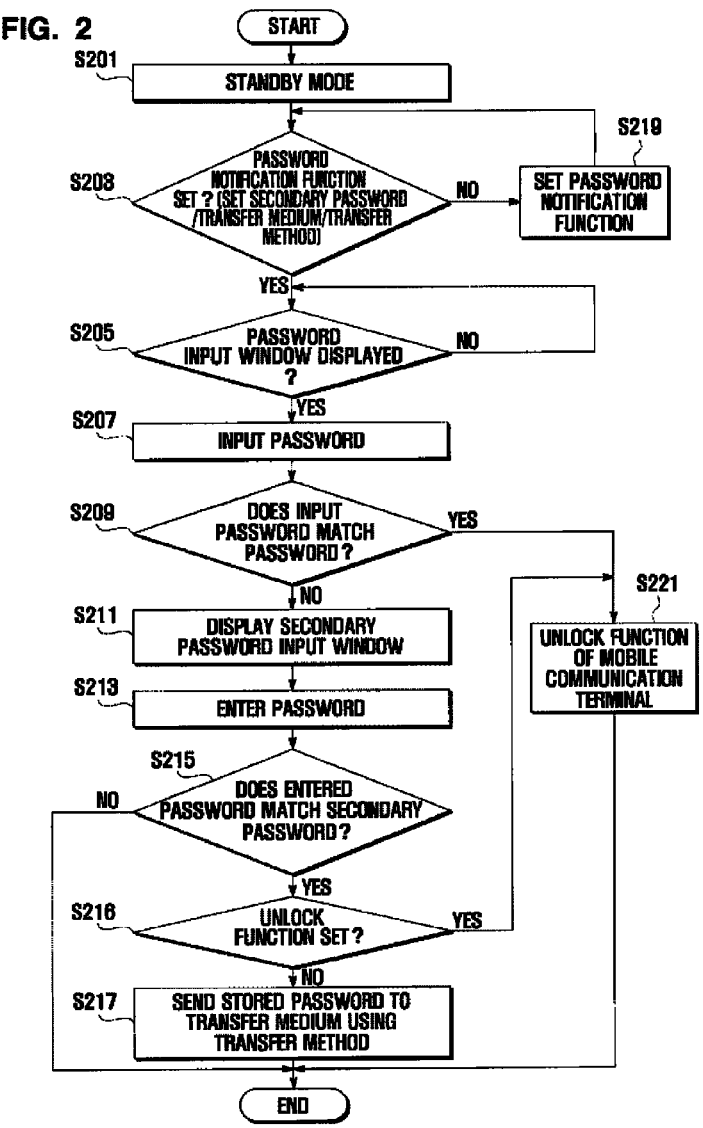

MOBILE COMMUNICATION TERMINAL HAVING PASSWORD NOTIFY FUNCTION AND METHOD FOR NOTIFYING PASSWORD IN MOBILE COMMUNICATION TERMINAL

PRIORITY

This application is a Continuation Application of U.S. patent application Ser. No. 14/064,882, filed in the U.S. Patent and Trademark Office on Oct. 28, 2013, which is a Continuation Application of U.S. Pat. No. 8,572,393, issued on Oct. 29, 2013, which claims priority to Korean Patent Application No. 2006-0091955, filed on Sep. 21, 2006, which are all hereby incorporated by reference for all purposes as if fully set forth herein.

BACKGROUND OF THE INVENTION

1. Field of the Invention

The present invention relates to a mobile communication terminal having a password notification function and a method for notifying a user of a password in the mobile communication terminal. More particularly, the present invention relates to a mobile communication terminal having a password notification function and a method for notifying a user of a password in the mobile communication terminal that allows transmission of a stored password or newly generated random password to a previously selected medium when an input password does not coincide with the stored password and a secondary password is entered by the user.

2. Description of the Related Art

With the recent expansion in information utilization and computerization in all aspects of everyday life, passwords are needed to access computer media, to perform credit transactions such as purchasing a product through an Internet shopping mall, and to withdraw cash from a bank. Thus, users may have many different passwords, which are very often difficult for them to remember.

Currently, mobile communication terminal users are required to enter passwords for international telephone services and Internet services in order to prevent excessive or inappropriate billing due to the unauthorized use of these services. Further, users are required to set passwords to prevent disclosure of personal information stored in their mobile communication terminals.

However, if a user has not accessed the service that requires the input of a password for a long period of time, the user may confuse the password with another password or forget the password entirely. Additionally, if a user frequently changes passwords, the user may confuse current passwords with previous passwords. In these cases, the user must gather the necessary identification documents and visit a service center in order to recover the forgotten password.

SUMMARY OF THE INVENTION

The present invention has been made to address at least the above problems and/or disadvantages and to provide at least the advantages described below. Accordingly, an aspect of the present invention provides a method for notifying a user of a password in a mobile communication terminal, thereby allowing a user to easily obtain a forgotten password without compromising security.

Another aspect of the present invention provides a mobile communication terminal having a password notification function.

According to one aspect of the present invention, a method is provided for unlocking an electronic device. A first input screen portion for unlocking the electronic device from a locking mode is displayed. A first input is received from a user via the first input screen portion. The first input is compared with a first user-defined information stored in the electronic device. A second input is received from the user via a second input screen portion. The second input screen portion is displayed after a determination that the first input does not match from the first user-defined information. The second input is compared with a second user-defined information stored in the electronic device. In response to the second input matches to the second user-defined information, the electronic device is unlocked from the locking mode.

According to another aspect of the present invention, an electronic device is provided that includes memory to store first information and second information of user-defined information in relation to a user. The electronic device also includes a controller configured to: display a first input screen portion for unlocking the electronic device from a locking mode; receive a first input from a user via the first input screen portion; compare the first input with a first user-defined information stored in the electronic device; receive a second input from the user via a second input screen portion, the second input screen portion is displayed after a determination that the first input does not match from the first user-defined information; compare the second input with a second user-defined information stored in the electronic device; and unlock the electronic device from the locking mode in response to the second input matches to the second user-defined information.

According to a further aspect of the present invention, a non-transitory computer-readable storage medium is provided that stores instructions that, when executed by one or more processors, cause the one or more processors to perform operations comprising: displaying, a first input screen portion for unlocking the electronic device from a locking mode; receiving a first input from a user via the first input screen portion; comparing the first input with a first user-defined information stored in the electronic device; receiving a second input from the user via a second input screen portion, the second input screen portion is displayed after a determination that the first input does not match from the first user-defined information; comparing the second input with a second user-defined information stored in the electronic device; and in response to the second input matches to the second user-defined information, unlocking the electronic device from the locking mode.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 2 is a flowchart showing a method for notifying a user of a password in a mobile communication terminal according to an exemplary embodiment of the present invention;

DETAILED DESCRIPTION OF EMBODIMENTS OF THE PRESENT INVENTION

Figure 1:
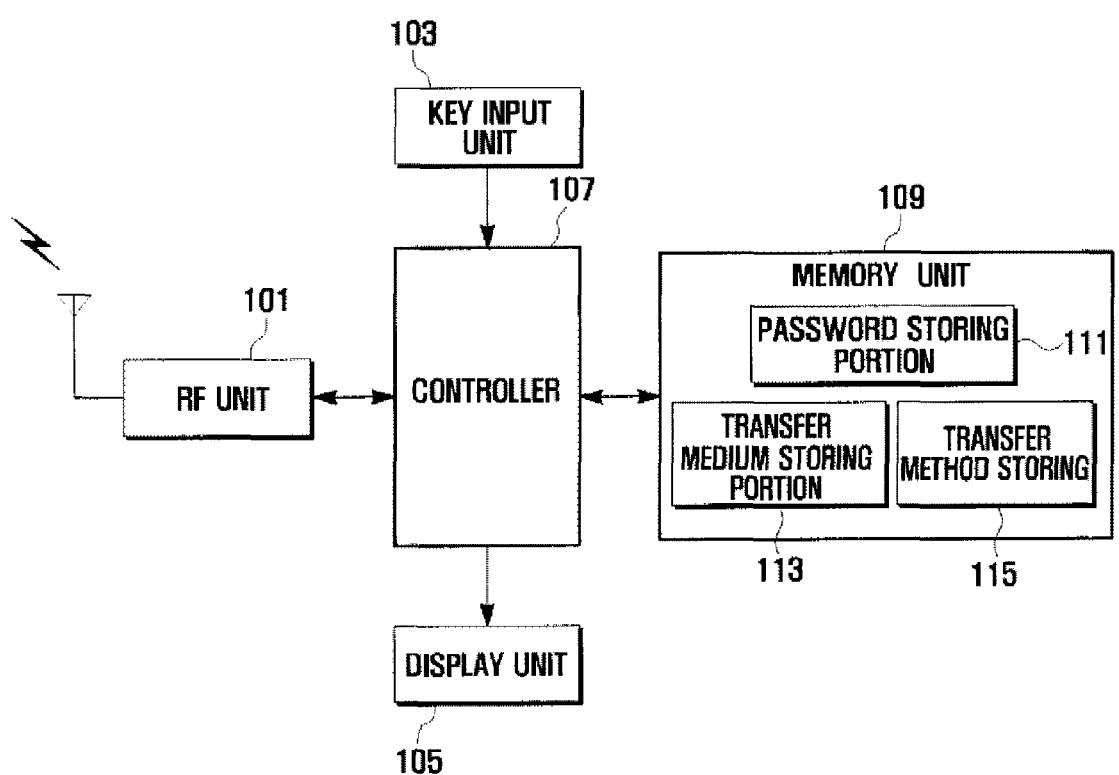
FIG. 1 is a block diagram showing a configuration of a mobile communication terminal for notifying a user of a password according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the 10 drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element 15 is referred to as being "directly on" or "directly connected to" another element or layer, there are no intervening elements or layers present.

In the exemplary embodiments, the term "password" refers to a password that is entered to unlock a specific function or all functions that are locked to prevent others from viewing or using the functions. A "secondary password" refers to a password that is requested 20 when an input password does not coincide with a stored password during an authentication operation. The secondary password may be a password that is frequently used by the user and is not subject to any length or character limitations.

FIG. 1 is a block diagram showing a configuration of a mobile communication terminal for notifying a user of a password according to an exemplary embodiment of the present invention.

Referring to FIG. 1, the mobile communication terminal according to the present exemplary embodiment includes a radio frequency (RF) unit 101, a key input unit 103, a display unit 105, a controller 107, and a memory unit 109.

The RF unit 101 performs the wireless communications of the mobile communication terminal. The RF unit 101 includes an RF transmitter and an RF receiver. The RF transmitter amplifies a signal being transmitted and up-converts its frequency. The RF receiver low-noise amplifies a signal being received and down-converts its frequency.

The key input unit 103 receives a user's manipulation signal to control the operation of the mobile communication terminal. For example, the user may use the key input unit 103 to enter a password to unlock functions in the terminal or to set a function for notifying the user of a forgotten password.

The display unit 105 is controlled by the controller 107 to display output data. The display unit 105 may display a password input window, a secondary password input window, or a password transfer window according to exemplary embodiments of the present invention.

The controller 107 performs the overall control operation of the mobile communication terminal. The controller 107 also controls the transfer of a password to a previously selected external destination, such as another mobile communication terminal or an email address.

The memory unit 109 includes a data memory and a program memory for performing mobile communication. According to exemplary embodiments of the present invention, the memory unit 109 stores a program for transferring a primary password to an external destination when a password entered by the user matches a stored secondary password. The memory unit 109 also includes a password storing portion 111 to store primary and secondary passwords, a transfer medium storing portion 113 to store information about an external destination to which a primary password is to be sent, and a transfer method storing portion 115 to store a selected method for transferring the primary password.

Figure 3A:
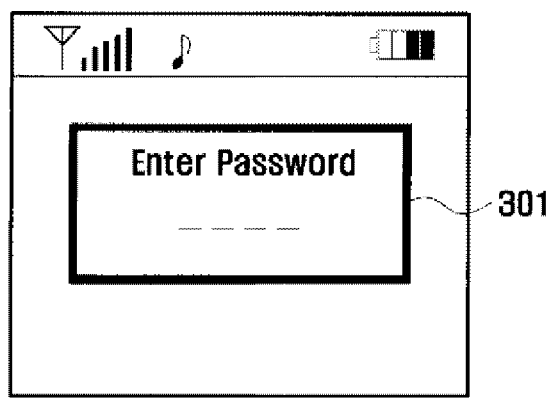
FIG. 3A shows a screen of a mobile communication terminal for notifying a user of a password, displaying a prompt requesting a password, according to an exemplary embodiment of the present invention.
Figure 3B:
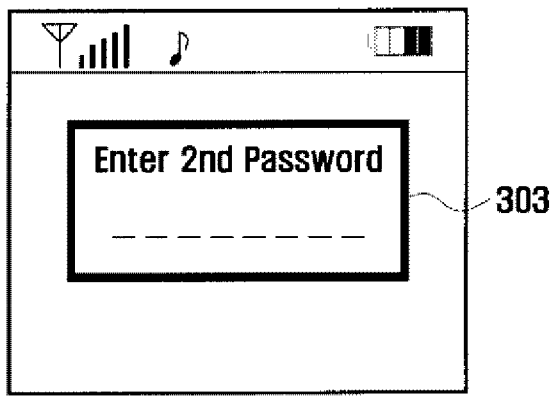
FIG. 3B shows a screen of a mobile communication terminal for notifying a password, displaying a prompt requesting a secondary password, according to an exemplary embodiment of the present invention.
Figure 3C:
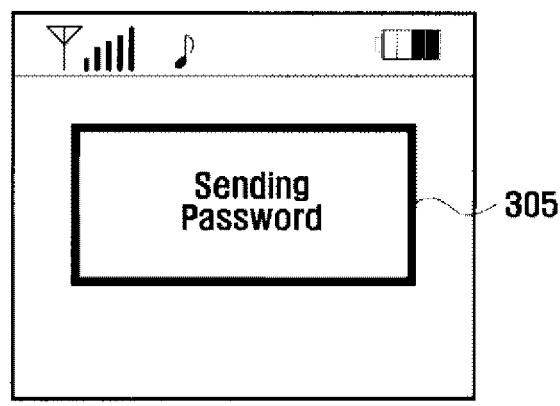
FIG. 3C shows a screen of the mobile communication terminal of FIG. 1 displaying a message to inform a user of the transfer of a stored password.

A method for notifying a user of a password in a mobile communication terminal according to an exemplary embodiment of the present invention is described in detail with reference to FIG. 1, FIG. 2, FIG. 3A, FIG. 3B, and FIG. 3C. FIG. 2 is a flowchart schematically showing a method for notifying a user of a password in a mobile communication terminal according to an exemplary embodiment of the present invention. FIG. 3A shows a screen of a mobile communication terminal for notifying a user of a password, displaying a prompt requesting a password, according to an exemplary embodiment of the present invention. FIG. 3B shows a screen of a mobile communication terminal for notifying a user of a password, displaying a prompt requesting a secondary password, according to an exemplary embodiment of the present invention. FIG. 3C shows a screen of the mobile communication terminal of FIG. 1 displaying a message to inform a user of the transfer of a stored password.

Referring to FIG. 1 and FIG. 2, the controller 107 recognizes a standby mode (S201). The controller 107 then checks whether a password notification function is set (S203). If the password notification function is not set, the controller 107 controls the key input unit 103 to set the password notification function (S219). When setting the password notification function, the controller 107 sets a secondary password in the password storing portion 111 of the memory unit 109. There are no limitations on the length or characters of the secondary password. It may be convenient to set the secondary password to a password frequently used by the user. For example, the secondary password may contain a combination of numbers and English characters. The controller 107 also selects the medium to which the password is to be transferred and the method by which the password is to be transferred and inputs this information to the transfer medium storing portion 113 and the transfer method storing portion 115 of the memory unit 109, respectively. For example, using the key input unit 103, the user may input a phone number of another mobile communication terminal or the user's e-mail address and set the notification function to transfer the password to either or both of the other mobile communication terminal and the e-mail address. When setting the password notification function, the user may set the controller 107 to unlock the functions of the mobile communication terminal, if the input number is identical to the stored secondary password.

Thereafter, the controller 107 checks whether a password input window is displayed on the display unit 105 (S205). If the password input window is not displayed on the display unit 105, the controller 107 controls the display unit 105 to display a password input window 301, as shown in FIG. 3A.

After the user responds to the password input window 301, the controller 107 receives input of a password that the user believes to be the password stored in the mobile communication terminal from the key input unit 103 (S207). That is, the user tries to remember the password stored in the mobile communication terminal and enters an attempted password into the password input window 301. Typically, the attempted password may be a 4-digit number.

Subsequently, the controller 107 checks whether the entered password is identical to the stored password (S209). If the entered password is identical to the stored password, the controller 107 unlocks the functions of the mobile communication terminal (S221).

If the entered number is not identical to the stored password, the controller 107 controls the display unit 105 to display a secondary password input window (S211). As shown in FIG. 3B, the controller 107 controls the display unit 105 to display a secondary password input window 303.

After the user responds to the secondary password input window 303, the controller 107 receives an input of a password that the user believes to be the stored secondary password through the key input unit 103 (S213). As described above, because the secondary password may be set to be a frequently used password, it may be remembered much more easily by the user than a primary password that may be easily forgotten due to frequent changes or little use.

The controller 107 then checks whether the input password is identical to the stored secondary password (S215). If the input password is not identical to the stored secondary password, the controller 107 terminates the process.

If the input password is identical to the stored secondary password in step S215, the stored password is sent to the previously selected terminal or e-mail address (S217). As shown in FIG. 3C, the password transfer window 305 informing the user of the transfer of the stored password is displayed on the display unit 105 and the stored password is sent to the medium that was set in step S203 using the set transfer method. For example, if the controller 107 set the transfer medium to be the user's e-mail address in step S203, the password is sent to the user's e-mail address.

If it is determined that the input password is identical to the stored secondary password in step 215 by the controller, the controller 107 checks whether the unlock function is set (S216). In other words, if the input password is identical to the stored secondary password, as described above, the stored password may be sent to a desired device. But the user should check the sent password again from the device in which the password transmitted. Accordingly, if the input password is identical to the stored secondary password, the controller 107 may unlock the functions of the mobile communication terminal (S221).

The mobile communication terminal having a password notification function and a method for notifying a user of a password in the mobile communication terminal according to the present exemplary embodiment allows the transmission of a primary password to a previously selected medium when, after the primary password is forgotten, the user enters a password that is identical to a secondary password, thus permitting the user to easily obtain the forgotten password without degrading security. The mobile communication terminal and the password notification method may improve user convenience.

Figure 4:
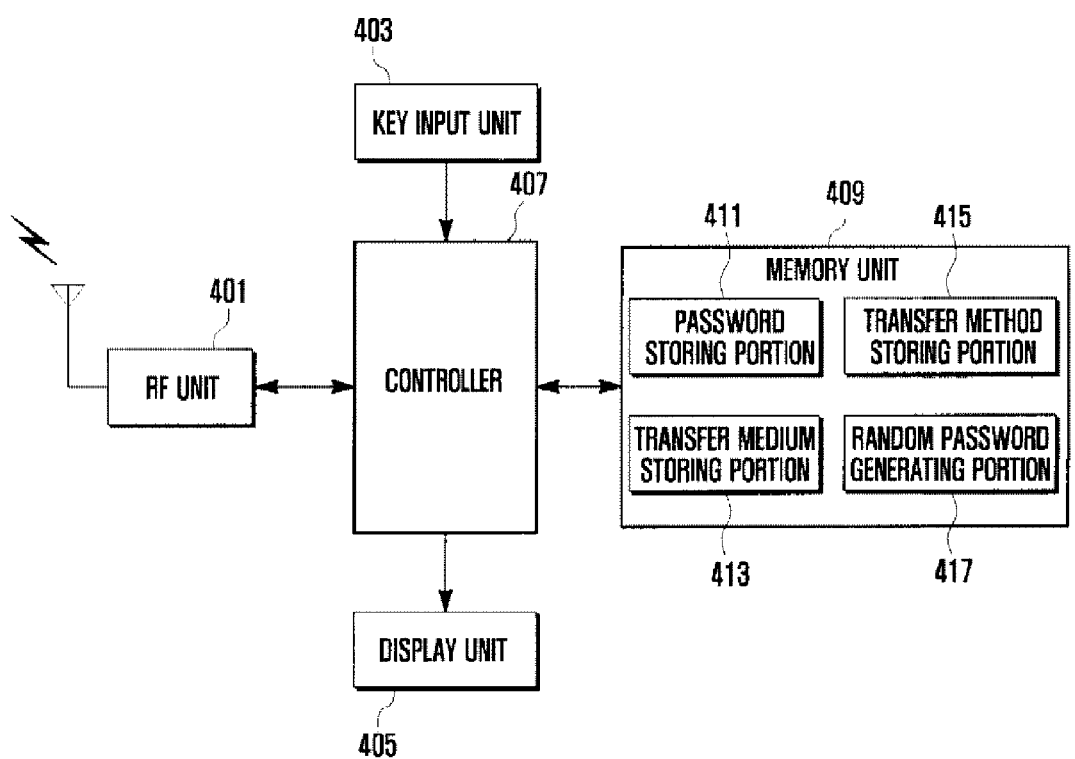
FIG. 4 is a block diagram showing a configuration of a mobile communication terminal for notifying a user of a password according to another exemplary embodiment of the present invention.

FIG. 4 is a block diagram showing a configuration of a mobile communication terminal for notifying a user of a password according to another exemplary embodiment of the present invention. A detailed description of elements having the same functions as their counterparts in the mobile communication terminal of FIG. 1 is not given.

A method for notifying a user of a password in the mobile communication terminal according to the present exemplary embodiment is similar to the method for notifying a user of a password in the mobile communication terminal of FIG. 1. The differing feature of the present exemplary embodiment is that a newly generated random password is transferred instead of a stored primary password when a password entered by the user coincides with a stored secondary password. That is, a memory unit of the mobile communication terminal according to the present exemplary embodiment further includes a random password generating portion.

Referring to FIG. 4, the mobile communication terminal according to the present exemplary embodiment includes an RF unit 401, a key input unit 403, a display unit 405, a controller 407, and a memory unit 409.

The key input unit 403 sets a function for generating a random password.

The display unit 405 displays a password transfer window informing a user of the transfer of a generated random password.

The controller 407 controls the key input unit 403, the display unit 405, and the memory unit 409 to generate and store a random password, and then sends the random password to a previously selected medium using a previously selected method.

The memory unit 409 stores a program for transmitting a random password to a previously selected external destination when a password entered by the user is identical to a stored secondary password. The memory unit 409 further includes a random password generating portion 417 for generating a random password.

Figure 5:
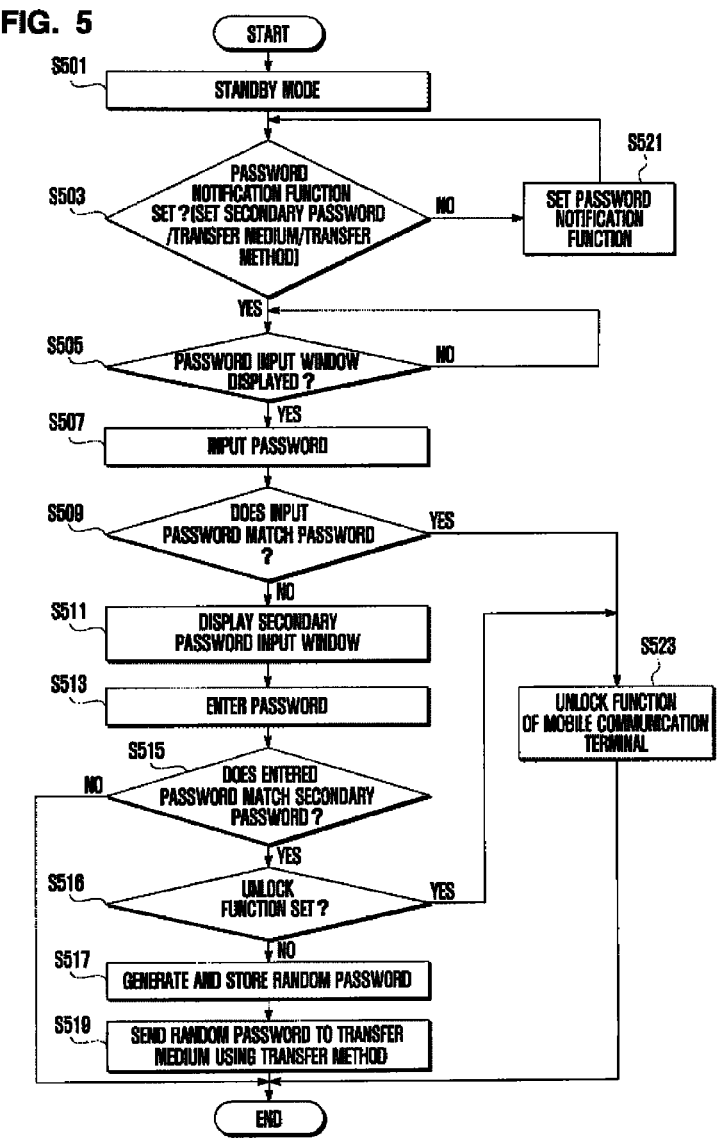
FIG. 5 is a flowchart showing a method for notifying a user of a password in a mobile communication terminal according to another exemplary embodiment of the present invention.
Figure 6:
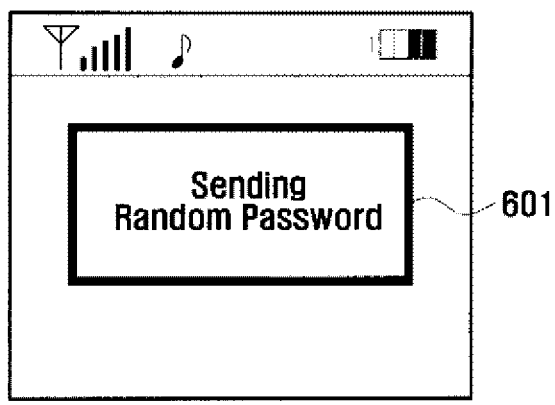
FIG. 6 shows a screen of the mobile communication terminal of FIG. 4 displaying a message to inform a user of the transfer of a newly generated random password.

A method for notifying a user of a password in a mobile communication terminal according to the present exemplary embodiment is described in detail with reference to FIG. 3A, FIG. 3B, FIG. 4, FIG. 5, and FIG. 6. FIG. 5 is a flowchart showing a method for notifying a user of a password in a mobile communication terminal according to another exemplary embodiment of the present invention. FIG. 6 shows a screen of the mobile communication terminal of FIG. 4 displayed to inform a user of the transfer of a newly generated random password. FIG. 3A shows a screen of a mobile communication terminal for notifying a user of a password, displayed to request a password, according to an exemplary embodiment of the present invention. FIG. 3B shows a screen of a mobile communication terminal for notifying a user of a password, displayed to request a secondary password, according to an exemplary embodiment of the present invention.

Referring to FIG. 4 and FIG. 5, the controller 407 recognizes a standby mode (S501). When setting the password notification function, the controller 407 also may be set to unlock the functions of the mobile communication terminal if the input number is identical to the stored secondary password.

The controller 407 then checks whether a password notification function is set (S503). If the password notification function is not set, the controller 407 controls the key input unit 403 to set the password notification function (S521). When setting the password notification function, the controller 407 sets a secondary password, a medium to which a password is to be transferred, and a method for transferring the password in a password storing portion 411, a transfer medium storing portion 413, and a transfer method storing portion 415 of the memory unit 409, respectively. The controller 407 also sets a function for generating a random password.

Thereafter, the controller 407 checks whether a password input window is displayed on the display unit 405 (S505). If the password input window is not displayed on the display unit 405, the controller 407 controls the display unit 405 to display a password input window 301, as shown in FIG. 3A.

After the user responds to the password input window 301, the controller 407 receives input of a password that the user believes to be the password stored in the mobile communication terminal from the key input unit 403 (S507).

Subsequently, the controller 407 checks whether the password entered by the user is identical to a stored password (S509). If the entered password is identical to the stored password, the controller 407 unlocks the functions of the mobile communication terminal (S523).

Conversely, if the entered password is not identical to the stored password, the controller 407 controls the display unit 405 to display a secondary password input window 303, as shown in FIG. 3B (S511).

After of the user responds to the secondary password input window 303, the controller 407 receives input of a password that the user believes to be the stored secondary password through the key input unit 403 (S513).

The controller 407 then checks whether the input password is identical to the stored secondary password (S515). If the input password is not identical to the stored secondary password, the controller 407 terminates the process.

If the input password is identical to the stored secondary password in the step S515, the controller 407 controls the random password generating portion 417 to generate a random password and controls the password storing portion 411 to store the generated random password (S517). The random password is a new password for the mobile communication terminal rather than of the stored password.

As described above, if it is determined that the input password is identical to the stored secondary password in step 515 by the controller, the controller 407 may unlock the functions of the mobile terminal (S516, S523). If the password is transmitted to a desired device, the transmitted password requires to be checked again. Therefore, as described above, if the secondary password is identical, the controller (407) may unlock the functions of mobile communication terminal.

Thereafter, the controller 407 sends the newly generated random password to a previously selected terminal or e-mail address using a previously selected transfer method (S519). More specifically, the controller 407 controls the display unit 405 to display a password transfer window 601 informing the user of the transfer of the random password, as shown in FIG. 6 and sends the random password to the medium selected in step S503 using the transfer method selected in step S503. And if the input password is identical to the stored secondary password, the controller may be set to unlock the functions of the mobile communication terminal; accordingly, unlocking of mobile communication terminal can be performed easily.

As described above, a mobile communication terminal having a password notification function and a method for notifying a user of a password in the mobile communication terminal according to the present invention enables the transmission of a stored password or a newly generated random password to a previously selected medium by allowing the user to enter a secondary password when an input password does not coincide with the stored password, thus permitting the user to easily obtain the forgotten password or a replacement password and enabling access without compromising security. Thus, the present invention may improve user convenience.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for unlocking an electronic device, the method comprising the steps of:
displaying, by the electronic device, a first input screen portion for unlocking the electronic device from a locked mode;
receiving, by the electronic device, a first input from a user via the first input screen portion;
comparing the first input with first user-defined information stored in the electronic device;
receiving, by the electronic device, a second input from the user via a second input screen portion, the second input screen portion is displayed by the electronic device after a determination that the first input does not match the first user-defined information;
comparing the second input with second user-defined information stored in the electronic device; and
when the second input matches the second user-defined information, unlocking the electronic device from the locked mode.

2. The method of claim 1, wherein at least one of a type, a length, and a complexity of the first user-defined information is different from a corresponding one of a type, a length, and a complexity of the second user-defined information.

3. The method of claim 1, further comprising displaying an indication corresponding to a length of the second input.

4. The method of claim 1, wherein unlocking the electronic device comprises transmitting a random password to a specified destination.

5. The method of claim 1, wherein unlocking the electronic device comprises transmitting the first user-defined information to a specified destination.

6. The method of claim 5, further comprising displaying an indication corresponding to a state associated with the transmitting of the first user-defined information.

7. The method of claim 5, wherein transmitting the first user-defined information comprises:
selecting at least one of a medium and a method for transmitting the first user-defined information to the specified destination, based at least in part on a user input.

8. The method of claim 7, wherein selecting the at least one of the medium and the method comprises checking an unlocking function associated with the at least one of the medium and the method.

9. An electronic device comprising:
a memory to store first user-defined information and second user-defined information in relation to a user; and
a controller configured to:
display a first input screen portion for unlocking the electronic device from a locked mode;
receive a first input from a user via the first input screen portion;
compare the first input with the first user-defined information stored in the memory;
receive a second input from the user via the second input screen portion, the second input screen portion is displayed after a determination that the first input does not match the first user-defined information;
compare the second input with the second user-defined information stored in the memory; and
unlock the electronic device from the locked mode, when the second input matches the second user-defined information.

10. The electronic device of claim 9, wherein at least one of a type, a length, and a complexity of the first user-defined information is different from a corresponding one of a type, a length, and a complexity of the second user-defined information.

11. The electronic device of claim 9, wherein the controller is further configured to display an indication corresponding to a length of the second input.

12. The electronic device of claim 9, wherein the controller is further configured to unlock at least one function of the electronic device based on a determination that a third input received from the user matches a random password.

13. The electronic device of claim 9, wherein the controller is further configured to display an indication corresponding to a transfer of a random password to a specified destination.

14. The electronic device of claim 13, wherein the controller is further configured to select at least one of a medium and a method to transmit the random password to the specified destination, based at least in part on a user input.

15. The electronic device of claim 14, wherein the controller is configured to:
check an unlock function associated with the at least one of the medium and the method.

16. The electronic device of claim 9, wherein the controller is further configured to unlock at least one function of the electronic device, when the second input corresponds to the second user-defined information.

17. A non-transitory computer-readable storage medium storing instructions that, when executed by one or more processors, cause the one or more processors to perform operations comprising:
displaying a first input screen portion for unlocking an electronic device from a locked mode;
receiving a first input from a user via the first input screen portion;
comparing the first input with a-first user-defined information stored in the electronic device;
receiving a second input from the user via a second input screen portion, the second input screen portion is displayed after a determination that the first input does not match the first user-defined information;
comparing the second input with second user-defined information stored in the electronic device; and
when the second input matches the second user-defined information, unlocking the electronic device from the locked mode.

18. The non-transitory computer-readable storage medium of claim 17, wherein at least one of a type, a length, and a complexity of the first user-defined information is different from a corresponding one of a type, a length, and a complexity of the second user-defined information.

19. The non-transitory computer-readable storage medium of claim 17, the operations further comprise displaying an indication corresponding to a length of the second input.

20. The non-transitory computer-readable storage medium of claim 17, wherein unlocking the electronic device comprises transmitting a random password to a specified destination.

21. An apparatus comprising:
memory to store first information and second information to be used to unlock the apparatus; and
a controller configured to:
receive a first input while the apparatus is in a locked state;
present, via a display operatively coupled with the controller, a request for a second input, based at least in part on a first determination that the first input does not match the first information;
receive the second input in response to the request; and
unlock the apparatus, based at least in part on a second determination that the second input matches the second information.

22. The apparatus of claim 21, wherein each of the first and second information comprises information registered by a user corresponding to the apparatus.

23. The apparatus of claim 21, wherein the controller is further configured to replace the first information with third information to be used to unlock the apparatus, the replacing being based at least in part on the second determination.

24. The apparatus of claim 21, wherein the controller is further configured to transmit a random password to a specified destination.

* * * * *